United States Patent Office 3,028,845
Patented Apr. 10, 1962

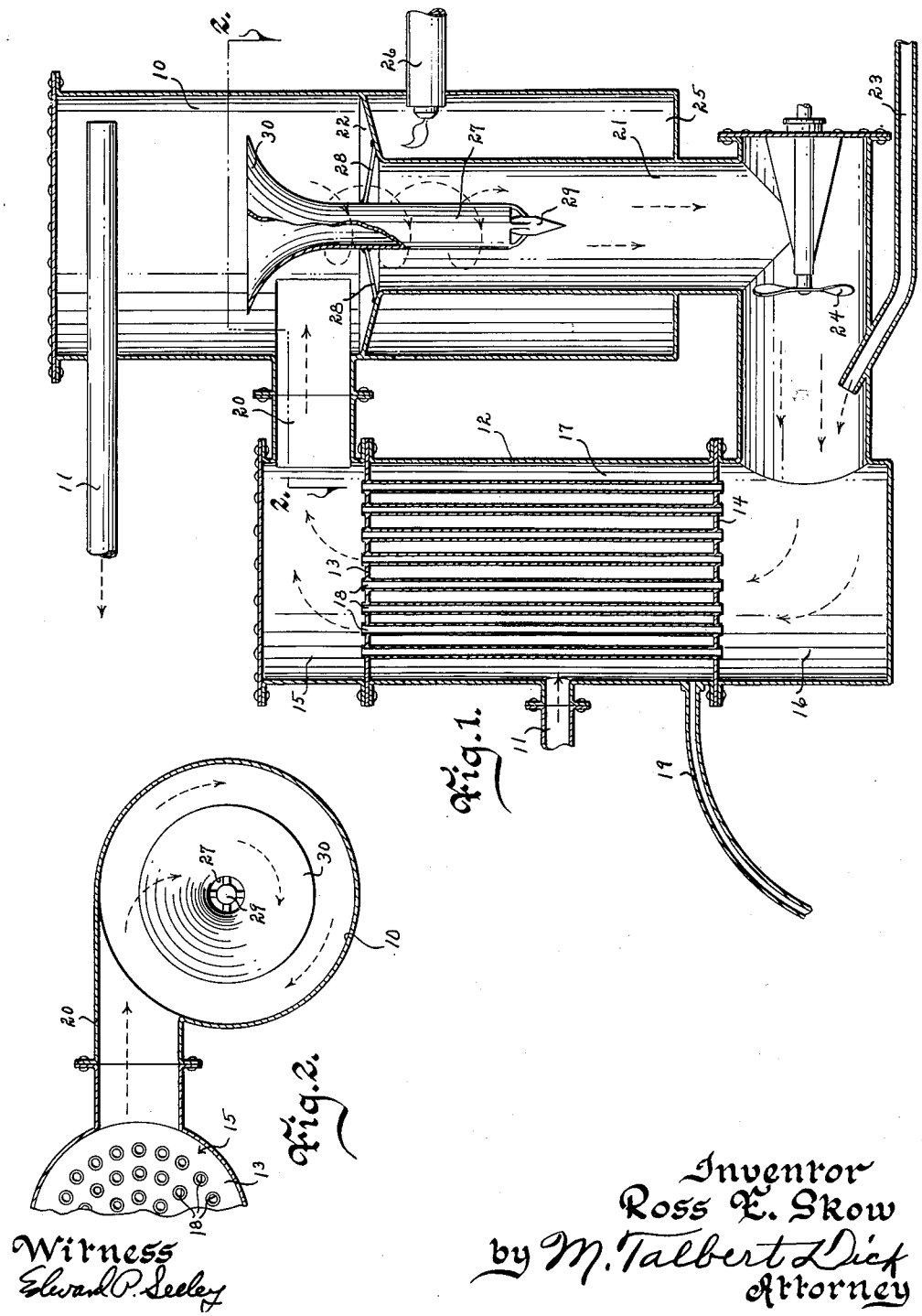

3,028,845
SURFACE FOAM ERADICATOR
Ross E. Skow, Kansas City, Mo., assignor to Hydro Engineering Corporation, Coral Gables, Fla., a corporation of Florida
Filed July 2, 1957, Ser. No. 669,647
1 Claim. (Cl. 122—491)

This invention relates to a liquid surface foam eradicator and more particularly to a means for eliminating the surface foam from a boiler of a liquid distilling unit whereby undesirable foam will not pass with the vapor into the condenser and dilute the purity of the condensate.

There are many types of liquid distilling devices now in use and a good example of a water purifying device is disclosed in my co-pending application, Serial No. 544,754, filed November 3, 1955, on the Method of and Device for Purifying Liquids. Such equipment is particularly designed for purifying salt or ocean water for human consumption, land irrigation, and like. One of the chief problems, however, in the treatment of salt water is that brackish water has a tendency to foam at the water surface during the time it is being reduced to steam. Inasmuch as this foam product is very light in weight, some of it will pass upwardly with and in the steam vapor and thus seriously affect the purity of the distilled water.

Therefore, the principal object of this invention is to provide a device for eliminating the foam from the surface of boiling liquids.

More specifically, the object of this invention is to provide a mechanical means for a boiler, or like, unit that will gather the surface foam of the liquid being distilled and direct the same downwardly in the mass of liquid whereby it will be consumed and dissipated.

A further object of this invention is to provide a surface foam eradicator that is self-cleaning.

A still further object of this invention is to provide a surface foam control means that has no working parts.

Still further objects of this invention are to provide a surface foam eradicator that is economical in manufacture and durable in use.

These and other objects will be apparent to those skilled in the art.

My invention consists in the construction, arrangements and combination, of the various parts of the device, whereby the objects contemplated are attained as hereinafter more fully set forth, specifically pointed out in my claim, and illustrated in the accompanying drawings, in which:

FIG. 1 is a side sectional view of my device installed and in use, and

FIG. 2 is a horizontal sectional view taken on line 2—2 of FIG. 1, and more fully illustrates its construction.

Obviously, my device may be used in conjunction with various types of liquid vaporizers. However, many parts of such devices are common and standard.

In the drawings, I have used the numeral 10 to designate a boiler tank and wherein the steam rises upwardly and passes out through the steam conduit 11. Normally, the conduit 11 will lead to the condenser which I have generally designated by the numeral 12. This condenser has an upper header 13 and a lower header 14, thereby creating the upper compartment 15, the lower compartment 16, and the center compartment 17. The numeral 18 designates condenser pipes extending through the compartment 17 and communicating with the insides of the compartments 15 and 16, respectively, as shown in FIG. 1. The conduit 11 communicates with the inside of the compartment 17 and the steam entering compartment 17 condenses and passes therefrom through the conduit 19 in the form of distilled liquid. The numeral 20 designates a large pipe connecting the inside of the compartment 15 with the inside lower area of the tank 10. This pipe 20 communicates with the circular tank 10 at a tangent, as shown in FIG. 2, and thus imparts a circular motion to the liquid entering the tank 10, as shown by broken arrows. This circular motion of the fluid aids in breaking up and partially reducing the amount of surface foam. The numeral 21 designates a large conduit communicating with the inside center bottom of the tank 10 and the inside of the compartment 16. The diameter of this pipe 21 is substantially one-third of the diameter of the tank 10. The bottom 22 of the tank 10 may slope inwardly and downwardly to terminate with the top of the pipe 21. The normal circulation of the liquid will be upwardly from the compartment 16 through the pipes 18 into the compartment 15, thence through the pipe 20 into the tank 10, thence downwardly through the pipe 21 and back into the compartment 16, to complete the cycle. Additional raw, relatively cold water may be fed through the pipe 23 into the lower end of the pipe 21 and into the compartment 16. To encourage this flow of the liquid, a motorized propeller 24 may be mounted in the pipe 21. In some instances, pre-heated raw water may be injected into the tank 10. If desired, the raw water in the tank 10 may be reduced to steam and any suitable means may be used to accomplish the same.

In the drawings, I show a combustion chamber 25 directly below the tank portion 10. The numeral 26 designates an oil burner, or like, extending into this combustion chamber. It is to such distilling apparatus that I install my surface foam eradicator and which I will now describe in detail. The numeral 27 designates a vertical pipe extending downwardly into the upper end portion of the vertical pipe 21. This pipe 27 has a diameter substantially less than the diameter of the pipe 21 and is held in the central bore of the pipe 21 by brackets 28. The numeral 29 designates a Venturi head installed in the lower end portion of the pipe 27. The pipe 27 extends upwardly within the tank 10 and has its upper end portion 30 flared to provide an inverted hollow cone portion, as shown in FIG. 1. The top of this cone area 30 is just below the normal water surface.

The practical operation of this device is as follows: As before indicated, the liquid enters the boiler tank 10, through the conduit 20, at a tangent to the tank 10, thereby imparting a circular motion to the incoming water, as shown by broken arrows in FIG. 2. This action tends to break up some of the foam on the surface of the water and which is just above the inverted open cone 30. Due to the propeller 24 and the Venturi 29, the surface water and foam will be pulled into and downwardly through the inverted cone 30 and pipe 27, thereby injecting the undesirable foam downwardly into the water current flowing through the pipe 21 and into the compartment 16. This directing of the foam back into the flow of liquid dissipates the foam, thereby eliminating foam at the surface of the boiling water in the tank 10.

Some changes may be made in the construction and arrangement of my surface foam eradicator without departing from the real spirit and purpose of my invention, and it is my intention to cover by my claim, any modified forms of structure or use of mechanical equivalents which may be reasonably included within their scope.

I claim:

In combination, a liquid boiler tank, a vapor outlet at the top area of said tank, a conduit having one end portion extending first downwardly from and communicating with the inside bottom of said boiler tank, and its other end communicating with the inside of said tank at a point above its bottom, a pipe inside said boiler tank having its lower end portion extending downwardly into the first mentioned end portion of said conduit, and a Venturi unit at the bottom of said pipe.

References Cited in the file of this patent

UNITED STATES PATENTS

| | | |
|---|---|---|
| 2,187,646 | Darrieus | Jan. 16, 1940 |
| 2,214,658 | Browning | Sept. 10, 1940 |
| 2,471,571 | Kimmell | May 31, 1949 |

FOREIGN PATENTS

| | | |
|---|---|---|
| 757,408 | France | Oct. 9, 1933 |
| 51,853 | Switzerland | Apr. 9, 1910 |